Feb. 16, 1960     D. A. ROHRER     2,925,370
ELECTROCHEMICAL LEAK STRUCTURE AND METHOD FOR PRODUCING SAME
Filed June 13, 1958
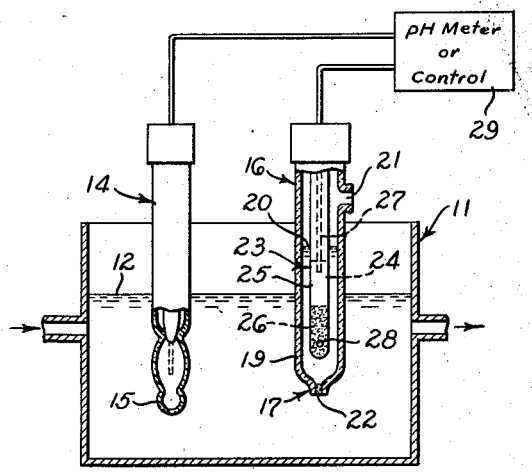
*Fig. 1.*
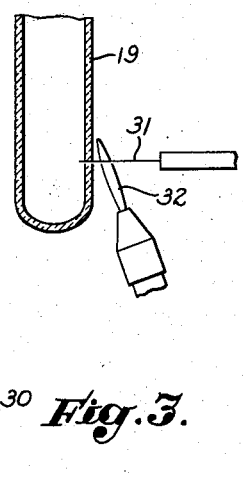
*Fig. 2.*
*Fig. 3.*
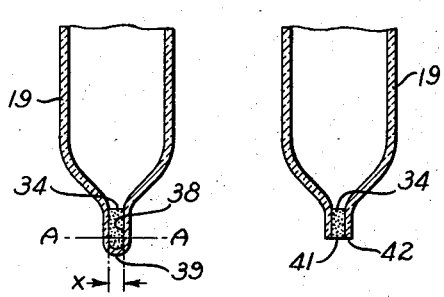
*Fig. 4.*    *Fig. 5.*
INVENTOR.
DAVID A. ROHRER
BY HIS ATTORNEYS.
HARRIS, KIECH, FOSTER & HARRIS United States Patent Office 2,925,370
Patented Feb. 16, 1960

2,925,370

ELECTROCHEMICAL LEAK STRUCTURE AND METHOD FOR PRODUCING SAME

David A. Rohrer, Whittier, Calif., assignor to Beckman Instruments, Inc., a corporation of California Application June 13, 1958, Serial No. 742,467

15 Claims. (Cl. 204—195)

This invention relates to a method and apparatus for forming leak structures, typically porous or "frit" type leaks useful as liquid junctions in the art of making electrochemical measurements. The present application is a continuation-in-part of my co-pending application Serial No. 615,983, filed October 15, 1956, and now abandoned.

In making electrochemical measurements, it is common to immerse a reference and an indicating electrode in a test solution, the electrodes being so constructed that the potential therebetween is a function of the concentration of a specific ion or ions. For example, a pair of such electrodes adapted to respond to hydrogen ion concentration is the basis of the widely-used pH meters employed for evaluation and control of pH.

Reference electrodes commonly employ a salt bridge tube containing a salt solution contacted by a half cell. To provide ionic communication between the salt solution and the test liquid around the salt bridge tube, a so-called liquid junction is employed. Preferably, this comprises a leak structure permitting a minute outflow of the salt solution to present a constantly renewed interface or junction with the test solution. Various structures have heretofore been employed, ranging from passages formed between contacting ground-glass surfaces to minute cracks traversing the wall of the salt bridge tube. It is also common to employ asbestos fibers traversing an opening in the tube.

The present invention has among its objects the provision of an improved liquid junction which can be very easily manufactured and which overcomes difficulties encountered with prior structures. In this connection, prior proposals have often involved slow and costly methods of fabrication or have produced undesirably large flows of the salt solution of insufficient velocity to maintain the passage or passages clear of contaminating substances. Also, some liquid junctions are adversely affected by certain test solutions, so that the reference electrode fails to give the reproducible potentials needed for accurate measurements. An object of the present invention is to provide a liquid junction producing potentials which are substantially independent of the character of the test solution.

The present invention also has among its general objects the provision of improved leak structures permitting minute flows of fluid between zones of different pressure. Some of the requirements of commercial leak structures are, first, that they be easily fabricated for extremely small leak rates; second, that it be possible to make a series of leaks with small leak variation; and third, that the material of the leak structure should be completely inert chemically. All of the above-mentioned requirements can be met by the present invention, with the important advantage that the leak structures can be made quickly, inexpensively and by the use only of routine skills.

It has been found that leak structures, e.g. the aforesaid liquid junctions and leaks, that are extremely sturdy and easy to manufacture can be produced by porous sintered plugs permanently bonded to the wall of a salt bridge tube or to the wall separating two zones of different pressure, the porous plug being preferably sintered in situ. It is an important object of the present invention to provide such leak structures and novel method of producing same.

Another object is to produce and employ a porous sintered plug made of a mixture of glass and solid particles of inert material.

A further object of the invention, in its preferred practice, is to fill a minute passage with a sinterable mixture of this type, typically in the form of a frit, and to sinter the mass in situ. It is also an object of the invention to bond a sintered mixture in a passage of a glass wall, the mixture comprising a finely divided glass and a finely divided inert material, the bond being effected by fusion of glass particles of the mixture to the glass of the wall.

It is a further object of the invention to provide a leak structure which can be processed, as by grinding, to adjust the flow therethrough or the electrical resistance thereof.

Further objects and advantages of the invention will be evident to those skilled in the art from the embodiments hereinafter exemplified.

Fig. 1 diagrammatically illustrates an electrochemical cell including a reference electrode embodying one form of the invention;

Fig. 2 is a view illustrating one step in forming one species of the invention;

Fig. 3 is a sectional view of a section of the tube wall, illustrating such species of the invention, the diameter of the plug being greatly enlarged for clarity; and Fig. 4 illustrates a second species of the invention before completion, while Fig. 5 illustrates this species in completed form.

Referring particularly to Fig. 1, the electrochemical cell 11 contains a test solution 12 which may be a static body or which may be renewed by flow through the ingress and egress lines shown. Submerged in the test solution 12 is a measuring electrode, typically a glass electrode 14 having an ion-sensitive membrane 15, the electrode 14 being illustrated as a commercial glass electrode of the type used in making pH determinations. Also submerged in the test solution 12 is a reference electrode 16 with which the liquid junction 17 of the invention is associated. The simplest liquid junction 17 of the invention is illustrated in Figs. 2 and 3 but is so minute that its presence can hardly be detected or shown, wherefore the junction exemplified in Fig. 1 is of the type to be described with reference to Figs. 4 and 5.

The reference electrode 16 is shown as including a salt bridge tube 19 containing a salt solution 20 inserted through an opening 21 to a level above that of the test solution 12 to provide a small head across the liquid junction 17. If the liquid junction is a porous mass 22 bonded in an opening of the tube 19, as is contemplated by the invention, a minute stream of the salt solution will exude from the porous mass to present a constantly renewed liquid junction with the test solution. Microscopic portions of the stream within the pores of the mass may flow at relatively high forward velocities even though the volumetric flow rate is very low and may be only a small fraction of a milliliter per day if the head is only a matter of a few centimeters. A conventional half-cell 23 of any suitable type depends in the tube 19, being illustrated as of the type in which a body 24 of a mercury-calomel mixture is supported in a tube 25 on a mass of glass wool 26 with an amalgamated conductor 27 entering the body 24. The body 24 is in ionic communication with the salt solution through a small hole 28 in the tube 25. Any other type of half-cell 23 may be substituted.

The electric potential developed between the glass and reference electrodes 14 and 16 is a function of the hydrogen or hydroxyl ion concentration of the test solution and can be used to actuate a meter or control mechanism 29.

Conventionally the tube 19 is formed of glass, and boro-silicate or lead glasses will be found entirely suitable. In the embodiment of Figs. 2 and 3, a minute channel in the form of a hole 30, shown greatly enlarged in Figure 3, is formed through the wall of tube 19, as by rotating a wire 31 heated by a torch flame 32 until it pierces the wall. The cross-sectional area of the hole 30 may be so small that the hole is not apparent to the eye. For example, holes of a diameter of about .1-2 mm., sometimes more with thick-walled tubes, may be successfully employed with this species of the invention. Ratios of length of the hole 30 to diameter thereof will, taken with the viscosity of the sinterable frit used, limit to some extent the diameter. Such ratios usually are greater than 2:1.

A fluid frit, sinterable in situ in the hole 30 when the tube wall is heated to a working temperature and formed of a mixture of glass and inert material as will be described, is rubbed into or pressed into the hole to fill the cross section thereof. The adjacent zone of the tube wall and the plug formed by the sinterable frit are then heated to such temperature that the frit sinters and becomes a porous plug 34 and the glass of the tube wall softens to contract to some extent around the plug by surface tension to bond the porous plug permanently in place. Such bonding represents to some extent a fusion of the glass particles of the plug with the glass of the wall, as by employing glasses of commensurate fusing temperatures. In the embodiment under discussion, it becomes possible to make excellent liquid junctions by the almost unbelievably simple process of puncturing the tube wall, rubbing a suitable frit in the opening and heating the surrounding area, even in a simple glassblower's flame, to a working temperature, typically about 650–950° C. (between a dark red and a bright red heat) for borosilicate glass tubes and about 500–750° C. (between incipient red and dark red heat) for lead glass tubes.

The preferred embodiments of the invention are characterized by at least a partial sintering in situ of an appropriate frit or mass of material. This material should be sinterable within the working temperature range of the tube material so that the latter material closes around the former material and effectively eliminates any channels through the wall at the junction of the materials, the porosity of the sintered plug supplying the flow channels for the salt bridge solution. In speaking of a sinterable material, reference is made to any material which is at least incipiently fusible at the working temperature of the wall material and which on cooling will form a rigid porous structure. For purpose of exemplification, the material of the wall and the sinterable material of the plug will be exemplified as glass.

The preferred frit, sinterable in situ, is a mixture of two finely divided materials, namely a glass of relatively low fusing temperature and a particulate electrochemically inert material of relatively high fusing temperature which is infusible at the fusing temperature of the glass.

The glass of the mixture is preferably a finely ground glass having a fusing temperature within the range of working temperatures of the glass of the tube 19 and preferably having a coefficient of thermal expansion approximately equal to the glass of the tube wall. The glass of the mixture may well be the same glass as that of the tube or very similar thereto. For example, with conventional borosilicate tubes, a ground borosilicate glass passing a 150 mesh screen will be found suitable, albeit the screen size may vary considerably from the value exemplified.

The inert or "infusible" material of the mixture should be a solid material that is physically and chemically inert at the sintering temperature. By the term physically and chemically inert I have reference to a material that will neither melt, volatilize nor disintegrate at the sintering or fusing temperature of the glass of the mixture and which will not dissolve in or react appreciably with this glass.

In the forming of electrochemical liquid junctions the inert material should be electrochemically inactive in the sense of having no tendency by its presence per se in the mixture to introduce spurious potentials across the liquid junction structure, e.g., false, non-reproducible or unstable potentials. Such classes of materials are well known by those skilled in the art. Examples of inert materials useful separately or in combination in the invention are carbides of metals and non-metals, e.g., tungsten carbide, silicon carbide, boron carbide; refractory silicates and silicate compositions, e.g., mica, asbestos, garnet, porcelains, zircon, sillimanite; metal oxides such as titanium oxide, zirconium oxide, aluminum oxide; metals such as chromium, vanadium, molybdenum, tantalum, zirconium, germanium and the noble metals, e.g., platinum, palladium and iridium; alloys of any such metals; refractory nitrides, e.g., boron nitride; silica, vitreous or crystalline; aluminates, e.g., spinel (magnesium aluminate); etc.

The inert material should be present in particulate form uniformly dispersed throughout the mixture. The exact degree of fineness is not critical. The preferred material is Carborundum or silicon carbide in powder form, typically of the FFF grade although other ground materials mentioned above can well be used.

The inert particles in the sintered plug are important to the invention. They physically separate the glass particles of the initial mixture and hence inhibit their coalescence at the sintering temperature. They reduce the tendency of the glass to flow or settle during sintering because to a greater or lesser extent the inert particles act as a framework or skeleton increasing the rigidity of the resulting porous mass. Inhibiting coalescence and resulting loss of porosity can be accentuated by using particles of a selected inert material that is relatively non-wettable by the glass of the mixture. Some inert materials by virtue of their greater heat conductivity as compared with glass may allow the sinterable mass to heat up to sintering temperature more rapidly or uniformly and to cool from such temperature more rapidly or uniformly, the inert material forming a pathway for heat through the glass network so that the mass can be sintered more rapidly and more uniformly in depth. Finally, the inert particles may be selected to have a thermal coefficient of expansion differing from that of the glass of the mixture. While this is not essential and while porous masses can be produced even if the thermal coefficients of the inert material and the glass are substantially the same, it is often desirable to use an inert material having a thermal coefficient differing from that of the glass of the mixture as this difference can play a role in determining the ultimate porosity of the sintered plug. This follows from the fact that separations or cracks are formed at the multitudinous interfaces during cooling of a mixture of two materials of different thermal coefficients, the size of such separations or cracks being a function of the coefficient difference. The inert material is often selected to have a coefficient of thermal expansion not less than and often substantially larger than that of the glass of the mixture. For example, silicon carbide has a coefficient of thermal expansion approximately 30% higher than that of borosilicate glass of the "Pyrex" type. On the other hand, the coefficient of thermal expansion for lead glass is higher than that of silicon carbide.

The ratio of the fusible to infusible components of the sinterable mixture can be varied over wide limits to adjust the porosity of the porous plug. Ratios of glass to inert material of about 1:1 by weight can be used but may vary from 2:1 to 1:2 and may extend to as high as about 15:1, representing about 6% inert material. The higher ratios are often desirable in producing the so-called high-pressure types of leak structures or where it is desirable to produce smaller pores and reduced flow therethrough.

The mixture may be fluidized or plasticized, to facilitate filling of the hole 30 by a simple rubbing operation, by adding a small amount of moisture or carrier liquid to the mix to form a paste. This moisture or carrier liquid evaporates before or during the heating and forms no essential part of the mixture.

The porous plug 34 may also be formed in situ by the species of the invention shown in Figs. 4 and 5, often desirable when somewhat larger-diameter plugs are to be produced. Here a portion of the tube 19, preferably an end portion thereof, is necked and drawn to form a pocket 38 closed by a tip 39 and constituting a closed-ended channel. A small mass of the aforesaid mixture is placed in the pocket 38. The end of the tube 19 is then heated to a working temperature, as by being heated in a flame. The mixture is such as to be sintered at this temperature, forming the porous plug 34 permanently bonded in the channel. If the fusing temperature of the glass of the mixture is within the working temperature range of the glass of the tube 19, the porous plug will be permanently fused to the tube 19 at the juncture of the wall and the plug by bonding of the glass particles of the sintered mass to the glass of the tube 19.

The tip 39 is then ground off to expose the porous plug 34. This grinding is preferably continued to a position A—A so that the end of the plug 34 and the immediately-adjacent area of the tube 19 respectively have flush ground surfaces 41 and 42, as illustrated in Fig. 5. The degree of grinding is determined by the desired electrical resistance and flow characteristics of the junction. The flush ground surfaces 41 and 42 have been found to produce easily-cleaned and excellently operating liquid junctions which are extremely rugged and capable of almost indefinite use. A similar grinding of the plug 34 and adjacent wall can be employed with the species of Figs. 2 and 3, if desired.

For general-purpose liquid junctions, the diameter or width of the plug 34, indicated by the dimension X in Fig. 4, will typically be about .5 mm., but may range from a somewhat smaller dimension up to about 1 mm. With the so-called high-pressure types of liquid junctions, it has been found desirable that the plug 34 be larger in cross section in order to combine suitable flow characteristics with a reasonably low electrical resistance. In such high-pressure junctions, the dimension X may be about 2–10 mm.; also it may be desirable to change the composition as mentioned. As before, however, the tip 39 will be ground away to leave a plug 34 of the desired electrical and flow properties at the pressure for which the junction is designed. In the embodiment of Figs. 4 and 5, the ratio of plug length to diameter may be at least about unity by which I have reference to a ratio greater or somewhat less than 1:1.

By way of example, excellent small-diameter junctions have been produced by using equal parts by weight of ground borosilicate glass and ground porcelain, using the processes of Figs. 2, 3 or Figs. 4, 5. Similar in situ junctions of a diameter of about .5 mm. have been formed with mixtures of one part of borosilicate glass and two parts of Carborundum. Junctions of the in situ type in salt bridge tubes of lead glass have been produced by using equal parts of Carborundum and ground lead glass. It should be clear, however, that the ratios are limited only by the sinterable character of the mixture and by the porosity desired.

It is not always essential that the sinterable mixture be in powdered or fluid condition when placed in the passage formed by the hole 30 or the pocket 38. If an adhesive binder is used as the fluidizing or plastisizing agent, the mixture can be preformed to a shape insertable into the passage, the wall material contracting around and bonding or fusing locally to the glass particles of the mass during sintering by applied heat. The same is true if the mixture is partially sintered in an initial heating step which produces a solid or semi-solid mass of preformed shape insertable into the passage, the final sintering taking place in situ.

While the preferred species of the invention employ any of the aforesaid methods of sintering the mass in situ, it is sometimes possible to employ a porous member formed of the sinterable mixtures of the invention but presintered into filament or rod form of a size to be insertable into the passage and bond permanently with the wall when the latter is heated. In this instance the glass particles of the sintered porous mass will bond by localized fusions to the glass passage-forming wall. The latter will contract into contact with the porous mass when heated. It is always preferable that the glass particles have the ability to fuse with the glass material of the wall when the latter is brought to a working temperature. This, with the mechanical interlacing of the materials of the wall and the porous mass, will hold the plug permanently in place even if the dimension X is as high as 10 mm. and even when there are relatively large differences in the thermal expansion coefficients of the materials of the porous mass and the wall or when the leak is subjected to widely differing temperatures. These factors also insure that there shall be no peripheral by-passing so that the pores of the passage-filling mass form the sole communication between the zones on opposite sides of the wall, as is desired.

The embodiment of the invention shown in Figs. 2 and 3 is of particular utility in the production of liquid junctions or leaks. Without difficulty, this embodiment can be made of a diameter as small as several thousandths of an inch, which would be almost impossible with earlier proposals. Furthermore, such in situ embodiments can be applied anywhere on the apparatus that a hot-wire hole can be formed in a glass wall. With earlier types of junctions, for example, the necessary glass working could be conveniently done only in a few limited locations. Finally, the invention provides leak structures that are reproducible with accuracy in production and which can be made at a fraction of the cost of earlier leak structures.

While the invention has been exemplified with particular reference to forming electrochemical liquid junctions it will be clear that it can be employed likewise in forming other leak structures where minute but constant flows are desired from one zone to another in scientific instruments.

Various changes can be made without departing from the spirit of the invention and will be apparent to those skilled in the art from the exemplary embodiments herein disclosed.

I claim as my invention:

1. An electrochemical liquid junction structure comprising: a glass wall separating two zones and having a small opening therethrough interconnecting said zones, the glass of said wall softening and becoming moldable in a working temperature range; and a porous sintered plug in said opening formed of a mixture of solid particles and particles of glass sinterable at a temperature within said working temperature range of the glass of said wall, the glass of said mixture being fusible with the glass of said wall at said temperature within said working temperature range, the glass of said plug at the periphery thereof being fused to the glass of said wall, said solid particles being particles of an inert material infusible at said temperature within said working temperature range, said inert material being physically and chemically inert at said temperature and electrochemically inactive in the sense that its presence per se in the mixture introduces no spurious potentials across the liquid junction, the ratio of glass to inert material in said porous plug ranging from about 15:1 to about 1:2.

2. A liquid junction structure as defined in claim 1 in which said inert material comprises particulate silicon carbide.

3. A liquid junction structure as defined in claim 1 in which the diameter of said opening is less than 10 mm. and in which the ratio of the length of said porous plug measured longitudinally of said opening to the diameter of said opening is at least about unity.

4. A liquid junction structure as defined in claim 1 in which one end of said plug and the immediately adjacent area of the glass wall have flush ground surfaces.

5. A liquid junction structure as defined in claim 1 in which said inert material has a coefficient of thermal expansion different from that of the glass of said mixture.

6. A liquid junction structure as defined in claim 1 in which said inert material has a coefficient of thermal expansion greater than that of the glass of said mixture.

7. A liquid junction structure as defined in claim 1 in which the glass of said mixture has a coefficient of thermal expansion approximately equal to the glass of said wall.

8. A method of making an electrochemical liquid junction for controlled ionic communication between zones on opposite sides of a wall formed of glass which softens and becomes moldable in a working temperature range, which method includes the steps of: forming a channel in said glass wall; plugging said channel with a mixture of glass and particulate inert material, the glass of said mixture being fusible with the glass of said wall at a temperature within said temperature range, the particulate inert material being infusible at said temperature; simultaneously heating said mixture and the adjacent glass of said wall to said temperature to fuse the glass of said mixture to the glass of said wall; and cooling said mixture and the adjacent glass of said wall to form a porous plug bonded at its periphery to the glass of said wall, said inert material being physically and chemically inert at said temperature and electrochemically inactive in the sense that its presence per se in the mixture introduces no spurious potentials across the liquid junction, the amount of particulate inert material in said mixture being sufficient to maintain said plug porous, the ratio of glass to inert material in said mixture ranging from 15:1 to about 1:2.

9. A method of making an electrochemical liquid junction for controlled ionic communication between zones on opposite sides of a wall formed of glass which softens and becomes moldable in a working temperature range, which method includes the steps of: forming a channel in said glass wall; plugging said channel with a mixture of solid particles and particles of glass sinterable at a temperature within said working temperature range of the glass of said wall, the glass of said mixture being fusible with the glass of said wall at said temperature within said working temperature range, said solid particles being particles of an inert material infusible at said temperature within said working temperature range, said inert material being physically and chemically inert at said temperature and electrochemically inactive in the sense that its presence per se in the mixture introduces no spurious potentials across the liquid junction, the ratio of glass to inert material in said mixture ranging from about 15:1 to about 1:2; simultaneously heating said mixture and the adjacent glass of said wall to said temperature to sinter said mixture into a porous plug and fuse the glass at the periphery thereof to the glass of said wall; and cooling said mixture and the adjacent glass of said wall.

10. A method as defined in claim 9 including the step of adjusting the flow resistance through the cooled porous plug and the electrical resistance thereacross by simultaneously grinding back one end of said plug and the adjacent glass of said wall to reduce the length of said channel filled with the sintered mixture.

11. A method as defined in claim 9 in which said channel is formed with one end opening on one of said zones but with its other end sealed from the other of said zones by a bottom wall of the glass of said wall, and including the step of grinding away said bottom wall until the sintered mixture is exposed to the other of said zones.

12. A method as defined in claim 9 in which said inert material has a coefficient of thermal expansion different from that of the glass of said mixture.

13. A method as defined in claim 9 in which the glass of said mixture has a coefficient of termal expansion approximately equal to the glass of said wall.

14. A method of making an electrochemical liquid junction for controlled ionic communication between zones on opposite sides of a wall formed of glass which softens and becomes moldable in a working temperature range, which method includes the steps of: forming a channel in said glass wall; plugging said channel with a frit sinterable into a porous mass at a sintering temperature within said working temperature range of the glass of said wall, said frit comprising a mixture of finely divided solid particles and finely divided glass, the glass particles of said mixture being fusible with the glass of said wall at said sintering temperature, said solid particles being particles of an inert material infusible at said sintering temperature, physically and chemically inert at such temperature and electrochemically inactive in the sense that its presence per se in the mixture introduces no spurious potentials across the liquid junction, the ratio of glass to inert material in said frit ranging from about 15:1 to about 1:2; and simultaneously heating said frit and the adjacent glass of said wall to said sintering temperature and then cooling same whereby said frit sinters into a porous plug and the glass particles thereof fuse with the glass of said wall.

15. A method as defined in claim 14 in which said channel has a width within a range from a fraction of a millimeter up to several millimeters and in which said channel is filled with said frit to a depth at least about as great as the channel width, said method including the step of adjusting the flow resistance through the cooled porous plug and the electrical resistance thereacross by simultaneously grinding back one end of said plug and the adjacent glass of said wall, said grinding producing flush ground surfaces on said end of said plug and said adjacent glass.

References Cited in the file of this patent

UNITED STATES PATENTS

| | | |
|---|---|---|
| 1,944,738 | Grebe et al. | Jan. 23, 1934 |
| 2,289,687 | Stuart | July 14, 1942 |
| 2,684,938 | Mantzell | July 27, 1954 |

FOREIGN PATENTS

| | | |
|---|---|---|
| 521,432 | Great Britain | June 30, 1940 |